United States Patent [19]

McDonald

[11] 3,936,101

[45] Feb. 3, 1976

[54] COMPOSITE BEARING

[75] Inventor: Alexander Duncan McDonald, Portishead, England

[73] Assignee: Cam Gears Limited, Hitchin, England

[22] Filed: Aug. 19, 1974

[21] Appl. No.: 498,327

[30] Foreign Application Priority Data

Aug. 30, 1973 United Kingdom............... 40788/73

[52] U.S. Cl.............................. 308/26; 308/237 R
[51] Int. Cl.² ......................................... F16C 27/00
[58] Field of Search ............ 308/15, 26, 27, 28, 29, 308/36, 237 R, 237, 238

[56] References Cited
UNITED STATES PATENTS 3,022,126  2/1962  Siebert............................ 308/237 R
3,829,184  8/1974  Chevret............................ 308/26 X

*Primary Examiner*—Philip Goodman
*Assistant Examiner*—Gene A. Church

[57] ABSTRACT

The invention described includes a resilient support sleeve mounted on a tubular liner which is located within a tubular outer casing. The support sleeve includes a centre portion dimensioned to make a firm fit with the liner, and opposite end portions dimensioned to make a firm fit with the outer casing. The regions of the support sleeve between the centre and end portions are of reduced thickness thereby making the support sleeve distortable to accommodate slight angular misalignment and changes in dimension of the liner and outer casing.

7 Claims, 3 Drawing Figures

COMPOSITE BEARING

The present invention relates to a composite bearing assembly, and particularly to a composite bearing assembly which can be included in the steering assembly of a vehicle.

Two generally known types of steering assembly are the rack and pinion type in which two members are located in sliding engagement, and the rotatable type in which an inner rod-like member carrying the steering wheel is rotatably mounted in a tubular outer casing connected to a support structure of the vehicle body.

When designing the components for a vehicle steering assembly, difficulties arise in allowing for differences in, or changes in, the dimensions of the relatively movable parts of the assembly. For example, the components may have dimensions slightly different from that specified due to unavoidable manufacturing tolerances, and these components may alter in size due to wear and tear, or to temperature increase during operation.

It is an aim of the invention to produce a composite bearing assembly which can at least reduce the above-mentioned difficulties in producing a vehicle steering assembly; and accordingly the present invention provides a composite bearing assembly comprising a hollow elongated outer member, a hollow elongated inner member located within said outer member generally in axial alignment with said outer member, said inner member having its outer wall spaced from the inner wall of said outer member, and resilient means located between and in contact with said inner and outer walls, said resilient means having a first part bearing on one of said walls, and second and third parts bearing on the other of said walls, said second and third parts being located one on each side of said first part along the axis of the bearing assembly.

In a preferred arrangement, the resilient member may be a generally tubular sleeve having end portions to fit said outer member, and a central portion to fit said inner member and sections of reduced transverse cross-section connecting said central and end portions.

The sleeve may define a longitudinal slit extending along its length to enable the sleeve to be opened out to receive the inner member after which the sleeve is allowed to close so that the closed sleeve effectively constitutes a solid component. The sleeve may be provided with stop members to locate the inner member axially in the sleeve. These stop members may for example constitute inwardly extending end walls of the sleeve.

Another aim of the invention is to provide a composite bearing assembly comprising a housing, a shaft or inner rod rotatably supported within the housing; the housing having a bore, and the shaft being carried generally coaxially within the bore; a sleeve having an outer surface and closely fitting on the shaft, the outer diameter of the sleeve being less than the inner diameter of the bore thereby defining an annular clearance space between the outer surface of the sleeve and the inner surface of the bore; an annular resilient sleevelike support member located in the annular space; at least three annular portions or lands formed on the support member and axially spaced from each other, two of the lands being located adjacent the ends respectively of the support member and circumferentially engaging one of the two surfaces while the third of the lands is located intermediate the other two lands and circumferentially engages the other of the two surfaces, the annular regions of the support member intermediate the lands being of reduced wall thickness and providing clearance from at least one of the two surfaces; the resilient support member being supportable to accomodate deviations from strict axial alignment between the shaft and the associated sleeve on the one hand, and the bore in the housing on the other hand, without inhibiting relative rotation between the shaft and the bore.

The shaft is rockably supported within the housing, by which is meant that deviations from strict axial alignment between the shaft and the associated sleeve on the one hand, and the bore in the housing on the other hand may take place without inhibiting relative rotation between the shaft and the bore. The bore is preferably cylindrical and the sleeve preferably has a cylindrical outer surface.

One embodiment of the invention will now be described by way of example with reference to the accompanying drawings, in which.

Figure 1:
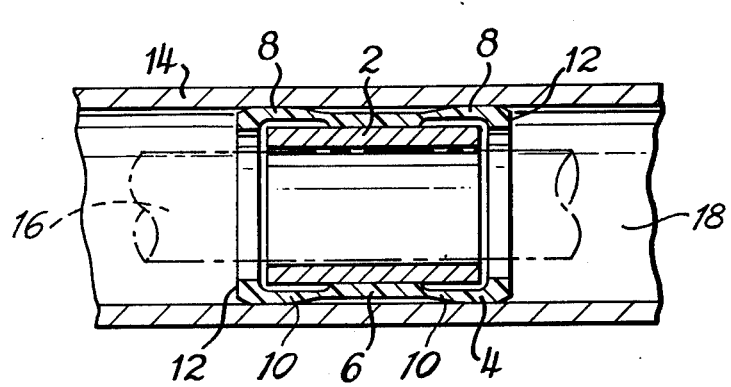
FIG. 1 is a side elevation in section of one composite bearing assembly of the invention.
Figures 2, 3:
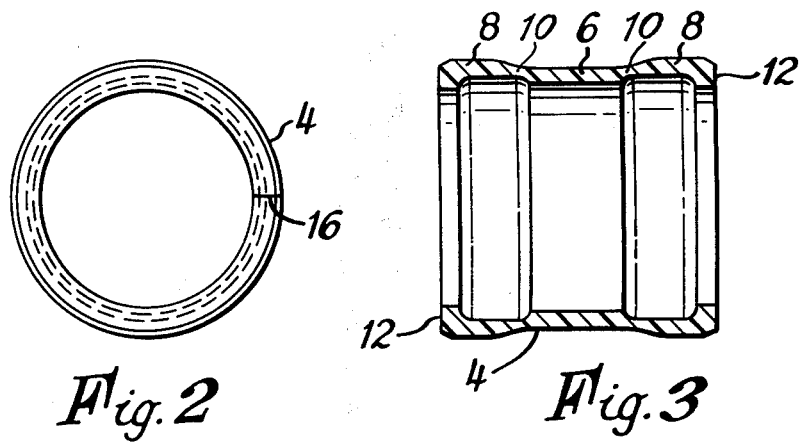
FIG. 2 is an end view of a sleeve forming part of the composite bearing assembly of FIG. 1.
FIG. 3 is a side elevation in section of the support sleeve of FIG. 2.

Referring to the drawings, one composite bearing of the invention is included in a rotatable steering assembly on a motor vehicle. The composite bearing includes a tubular inner liner or sleeve 2 of metal or hard plastics which is mounted in a support sleeve 4 made of material such as rubber, plastics or polyurethane which is more resilient than the material of the liner 2.

The sleeve 4 provides an annular, resilient sleeve-like support member and comprises a centre portion 6, two opposite end portions 8, two intermediate sections 10 connecting the centre and end portions, and two inwardly extending end rims 12. The centre and end portions 6 and 8 are dimensioned and arranged so that the centre portion 6 makes a firm fit with the liner 2, and the end portions 8 make a firm fit with a tubular outer casing 14 of the steering assembly. The inner rod or shaft 16 (shown in dot-dash outline in FIG. 1 only) of the steering assembly passes through the inner liner 2 which acts as a bearing for this inner rod.

The support sleeve 4 is slit along a line 16 which extends longitudinally along the length of the sleeve. The slit 16 enables the sleeve to be opened out to receive the liner 2, and when the liner is in position the slit 16 is allowed to close so that the sleeve effectively constitutes a solid component. The intermediate sections 10 are of thinner transverse cross-section than the centre portion 6 and end portions 8. This sleeve construction enables the sleeve to adjust its shape to accommodate to the external dimensions of the liner 2 and the internal dimensions of the outer casing 14. Outer casing 14 is seen to comprise a hollow elongated outer member or housing, within which a cylinder bore 18 is defined. The sleeve 4 will also adjust to accommodate any changes in the dimensions of the liner 2 and outer casing 14 which might occur during operation, due for example to localised heating in the vehicle. The end rims 12, axially locate the liner 2 in the sleeve 4.

It will be appreciated that the sleeve 4 can accommodate any changes in the dimensions of the liner 2 and the outer casing 14 which might occur either during manufacture or operation. In addition, slight angular misalignment or translational eccentricity between the inner rod or shaft 16 and outer casing 14 can be accommodated by the sleeve without seriously affecting the coupling of the inner rod and outer casing 14.

I claim:

1. A composite bearing assembly comprising a hollow elongated outer member, a hollow elongated inner member located within said outer member generally in axial alignment with said outer member, said inner member having its outer wall spaced from the inner wall of said outer member, and resilient means located between and in contact with said inner and outer walls, said resilient means having a first part bearing on one of said walls, and second and third parts bearing on the other said wall, said second and third parts being located one on each side of said first part along the axis of the bearing assembly.

2. A composite bearing assembly as claimed in claim 1, in which said resilient means is a generally tubular sleeve having end portions within said outer member, a central portion to fit said inner member, and sections of reduced transverse cross-section connecting said central and end portions.

3. A composite bearing assembly as claimed in claim 2, in which said sleeve defines a longitudinal slit extending along its length.

4. A composite bearing assembly as claimed in claim 2, in which said sleeve includes stop members adapted to locate said inner member axially in said sleeve.

5. A composite bearing assembly as claimed in claim 4, in which said stop members are inwardly extending end walls of said sleeve.

6. A composite bearing assembly comprising a housing, a shaft rotatably supported within said housing; said housing having a bore, and said shaft being carried generally coaxially within said bore; a sleeve having an outer surface and closely fitting on said shaft, the outer diameter of sleeve being less than the inner diameter of said bore thereby defining an annular clearance space between said outer surface of said sleeve and the inner surface of said bore; an annular resilient sleeve-like support member located in said annular space; at least three annular lands formed on said support member and axially spaced from each other, two of said lands being respectively located adjacent the ends of said support member and circumferentially engaging one of said two surfaces while the third of said lands is located intermediate said other two lands and circumferentially engages the other of said surfaces, the annular regions of said support member intermediate said lands being of reduced wall thickness and providing clearance from at least one of said surfaces; said resilient support member being distortable to accommodate deviations from strict axial alignment between said shaft and associated sleeve on the one hand and said bore in said housing on the other hand without inhibiting relative rotation between said shaft and said bore.

7. The composite bearing assembly of claim 6 wherein said bore is a cylindrical bore and said sleeve has a cylindrical outer surface.

* * * * *